US011855803B2

(12) United States Patent
Joshi et al.

(10) Patent No.: US 11,855,803 B2
(45) Date of Patent: Dec. 26, 2023

(54) LOOP DETECTION IN A COMPLEX TOPOLOGY WITH MULTIPLE DISTRIBUTED TUNNEL FABRICS

(71) Applicant: Hewlett Packard Enterprise Development LP, Houston, TX (US)

(72) Inventors: Vinayak Joshi, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 112 days.

(21) Appl. No.: 17/497,209

(22) Filed: Oct. 8, 2021

(65) Prior Publication Data

US 2023/0111305 A1   Apr. 13, 2023

(51) Int. Cl.
*H04L 12/46* (2006.01)
*H04L 45/74* (2022.01)

(52) U.S. Cl.
CPC .......... *H04L 12/4633* (2013.01); *H04L 45/74* (2013.01)

(58) Field of Classification Search
CPC ...... H04L 12/4633; H04L 45/00; H04L 45/18
See application file for complete search history.

(56) References Cited

U.S. PATENT DOCUMENTS

| | | | |
|---|---|---|---|
| 11,516,086 B1* | 11/2022 | Cherian | H04L 41/12 |
| 2009/0238080 A1* | 9/2009 | Hirano | H04L 45/00 |
| | | | 370/241 |
| 2015/0310342 A1* | 10/2015 | Liu | H04L 67/535 |
| | | | 706/48 |

* cited by examiner

*Primary Examiner* — Mansour Oveissi
*Assistant Examiner* — David M Oveissi
(74) *Attorney, Agent, or Firm* — Park, Vaughan, Fleming & Dowler LLP

(57) ABSTRACT

An apparatus for detecting a loop in a domain comprising a plurality of overlay tunnel fabrics is provided. The apparatus can include an indicator logic block that can insert a predetermined value, which can be unique for the apparatus in the domain, into an egress tunnel header of a packet of a data flow. The header's destination address can correspond to a remote apparatus of an overlay tunnel fabric that includes the apparatus. Tunnel encapsulation can be initiated and terminated within the corresponding overlay tunnel fabric. The indicator logic block can determine, for a respective packet of the data flow from a remote overlay tunnel fabric of the domain, whether the predetermined value is present in an ingress tunnel header. Upon identifying the predetermining value in the ingress tunnel header, a loop logic block of the apparatus can determine that a loop is present in the domain.

20 Claims, 9 Drawing Sheets

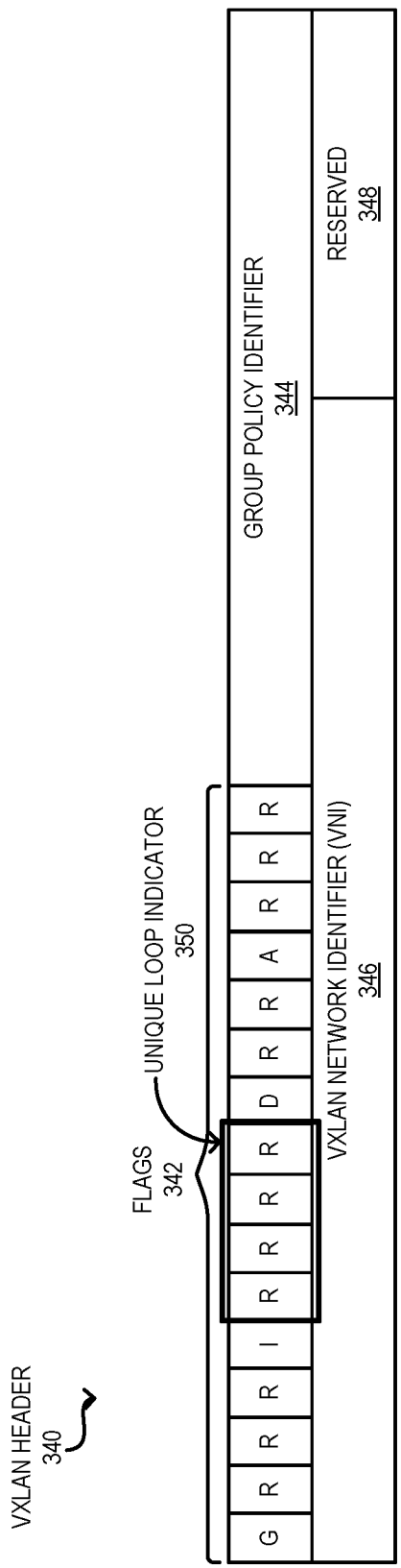

LOOP DETECTION IN A COMPLEX TOPOLOGY WITH MULTIPLE DISTRIBUTED TUNNEL FABRICS

BACKGROUND

Field

The present disclosure relates to communication networks. More specifically, the present disclosure relates to a method and system for facilitating loop detection in a complex topology comprising multiple distributed tunnel fabrics.

BRIEF DESCRIPTION OF THE FIGURES

FIG. 3C illustrates an example of incorporating a loop indicator in a tunnel header using a set of reserved flag bits, in accordance with an aspect of the present application.

FIG. 3D illustrates an example of incorporating a loop indicator in a tunnel header using a reserved field, in accordance with an aspect of the present application.

In the figures, like reference numerals refer to the same figure elements.

DETAILED DESCRIPTION

Figure 1:
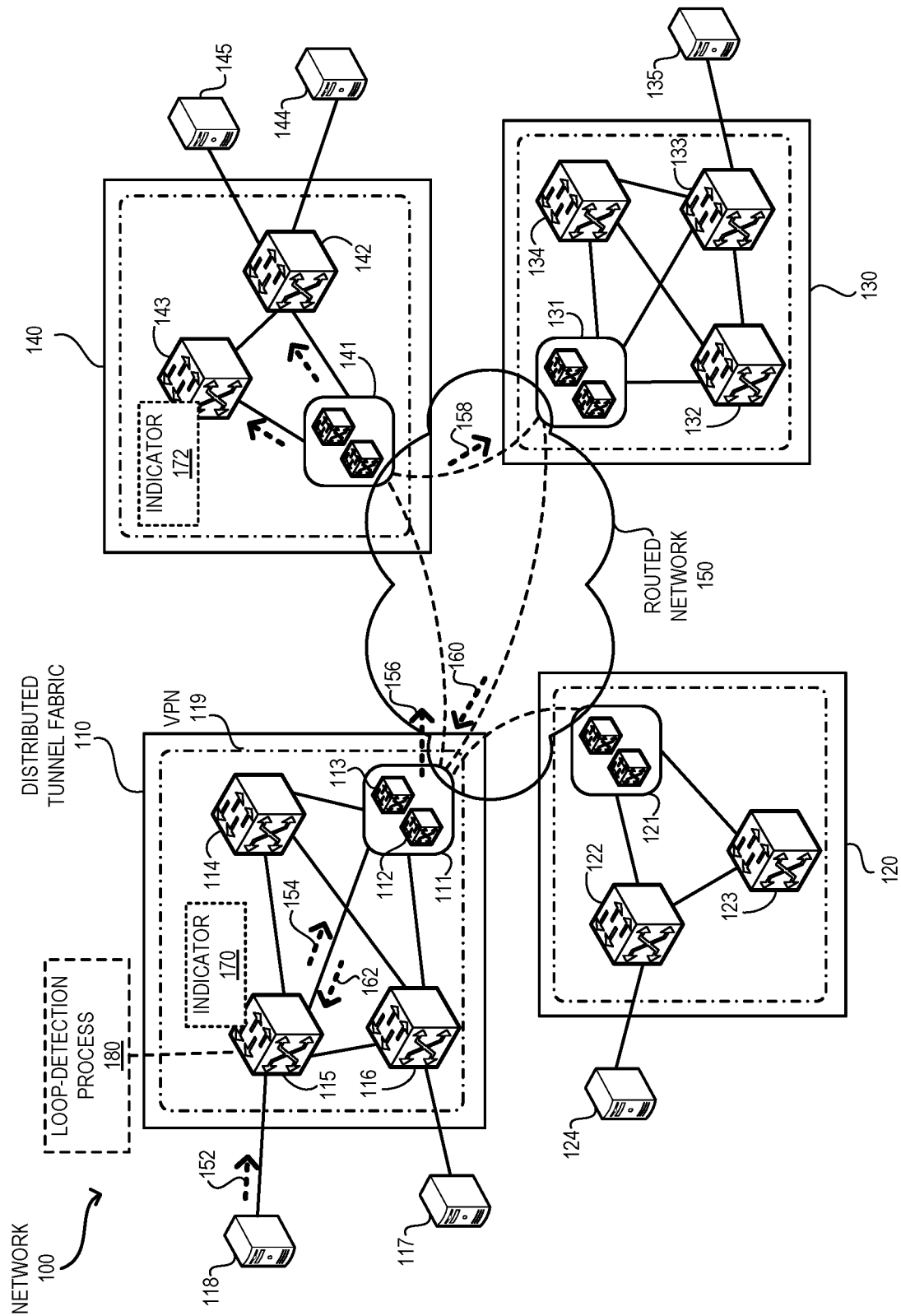
FIG. 1 illustrates an example of loop detection in a complex network topology comprising multiple distributed tunnel fabrics, in accordance with an aspect of the present application.

The following description is presented to enable any person skilled in the art to make and use the technology, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed. Since a VPN can be distributed across the fabric, a VPN over the tunnel fabric can also be referred to as a distributed tunnel fabric. A gateway of the fabric can be a virtual gateway switch (VGS) shared among a plurality of participating switches. Since a tunnel in the fabric may facilitate a layer-2 overlay over an underlying layer-3 network (e.g., an Internet Protocol (IP) network), detecting a loop can be an essential feature for the overlaid layer-2 network.

One aspect of the present technology can provide an apparatus for detecting a loop in a loop detection domain comprising a plurality of overlay tunnel fabrics. The apparatus can include an indicator logic block that can insert a predetermined value, which can be unique for the apparatus in the loop detection domain, into an egress tunnel header of a packet of a data flow. The destination address of the egress tunnel header can correspond to a remote apparatus of an overlay tunnel fabric that includes the apparatus. Tunnel encapsulation for a respective overlay tunnel fabric can be initiated and terminated within the overlay tunnel fabric. The indicator logic block can determine, for a respective packet of the data flow from a remote overlay tunnel fabric of the loop detection domain, whether the predetermined value is present in an ingress tunnel header for the received packet. Upon identifying the predetermining value in the ingress tunnel header, a loop logic block of the apparatus can determine that a loop is present in the loop detection domain.

In a variation on this aspect, the indicator logic block can determine whether the predetermined value is present in the ingress tunnel header by applying a packet inspection rule for the data flow to the packet at the forwarding hardware of the apparatus.

In a further variation, the forwarding hardware of the apparatus includes a ternary content-addressable memory (TCAM). An entry of the TCAM can include the packet inspection rule.

In a variation on this aspect, the remote apparatus can be a gateway of the overlay tunnel fabric. The gateway can maintain an inter-fabric tunnel with a second gateway of the remote overlay tunnel fabric. The inter-fabric tunnel may span a routed network.

In a variation on this aspect, the loop logic block can determine the presence of the loop in the loop detection domain by promoting the received packet to a control plane of the apparatus.

In a variation on this aspect, the apparatus can include a detection logic block that can apply the packet inspection rule to a plurality of data flows. The loop logic block can then determine the presence of the loop in the loop detection domain upon identifying the predetermined value in a received packet of at least one data flow.

In a variation on this aspect, the indicator logic block can insert the predetermined value in a predetermined location in the egress tunnel header. The predetermined location can be determined based on a tunneling protocol associated with the egress tunnel header.

In a further variation, the predetermined location can correspond to one or more of: a field of the egress tunnel header and an additional header supported by the egress tunnel header.

One aspect of the present technology can provide an apparatus for detecting a loop in a loop detection domain comprising a plurality of overlay tunnel fabrics. The apparatus can include an encapsulation logic block that can determine whether a predetermined value is present in an ingress tunnel header encapsulating a packet of a data flow. The source address of the ingress tunnel header can correspond to a remote apparatus of an overlay tunnel fabric that includes the apparatus. The predetermined value can be unique for the remote apparatus in the loop detection domain. The tunnel encapsulation for a respective overlay tunnel fabric is initiated and terminated within the overlay tunnel fabric. Upon determining the presence of the predetermined value, the encapsulation logic block can obtain the predetermined value before decapsulating the ingress tunnel header. An indicator logic block of the apparatus can then insert the predetermined value in an egress tunnel header encapsulating the packet. The destination address of the egress tunnel header can correspond to a remote overlay tunnel fabric of the loop detection domain In a variation on this aspect, the encapsulation logic block can determine whether the predetermined value is present in the ingress tunnel header by applying a forwarding rule at the forwarding hardware of the apparatus. The forwarding rule can indicate that the predetermined value is to be carried to the egress tunnel header from the ingress tunnel header.

In a further variation, the forwarding hardware of the apparatus includes a ternary content-addressable memory (TCAM). An entry of the TCAM can include the forwarding rule.

In a variation on this aspect, the indicator logic block can insert the predetermined value in a predetermined location in the egress tunnel header. The predetermined location can be determined based on a tunneling protocol associated with the egress tunnel header.

The aspects described herein solve the problem of efficiently detecting a loop in a complex network, which may include a plurality of distributed tunnel fabrics, by (i) incorporating a unique loop indicator associated with a switch of a fabric in a tunnel header; and (ii) determining the presence of a loop upon detecting the unique indicator in the tunnel header of an ingress packet. The switch can monitor the field of the tunnel header that may carry the unique identifier. Since the fields of the tunnel header of an ingress packet are typically monitored, the switch can detect a field in the complex network with a low computational overhead.

Typically, a respective switch pair in a distributed tunnel fabric forward packets to each other via a tunnel coupling them. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). Forwarding the packet via the tunnel includes encapsulating the packet with a tunnel header comprising source and destination addresses, and forwarding the packet based on the destination address of the tunnel header. A tunnel header may carry additional information in one or more fields of the tunnel header. Some tunnel header also allows incorporating additional headers for carrying additional information.

The fabric can include a VGS that can couple the fabric to other networks. Typically, at least two switches can operate as a single switch in conjunction with each other to facilitate the VGS. Switches participating in the VGS can be referred to as participating switches. A respective participating switch can consider the other participating switches as peer participating switches (or peer switches). The VGS can be associated with one or more virtual addresses (e.g., a virtual IP address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches.

To forward traffic toward the VGS, a tunnel endpoint of the fabric can perform a load balancing operation (e.g., based on hashing on a respective packet) and select one of the participating switches as the destination (i.e., as the other tunnel endpoint). The tunnel endpoint can then forward the packet via a tunnel between the tunnel endpoints. Typically, a source for a multicast group can be present outside of the fabric, whereas the client hosts can be connected to the fabric (e.g., reachable via the endpoint switches). The hosts can then reach the rest of the network (e.g., to the Internet) via the VGS.

Under some circumstances, a network can have a complex topology with a plurality of fabrics. The VGSs of these fabrics can be coupled to each other via a routed network (e.g., using Border Gateway Protocol (BGP)). The fabrics may be located in different geographic locations. A respective VGS pair can form a tunnel between them for communicating across the routed network. Hence, the complex network topology can be considered as a multi-hop overlay network. For example, the VGS can terminate a tunnel associated with the local fabric for a packet and re-encapsulate the packet with another tunnel to forward via the routed network.

Because of the geographically distributed nature of the complex network, a respective fabric of the network may be managed by different administrative entities. Furthermore, the end devices (e.g., user devices or hosts) can be mobile because of virtual machine (VM) migration and wireless mobility. Consequently, the client or tenant workload may move across fabrics and become unpredictable. Due to the complexity of the topology, diverse management, and unpredictable workload attachment, identifying a loop in such a complex network can be challenging.

To detect a loop in a network, a switch may inject synthetic traffic flow into the network. The synthetic traffic can be multi-destination traffic (e.g., broadcast, unknown unicast, or multicast (BUM) traffic) on a virtual local area network (VLAN) or the Internet Protocol (IP) traffic). If the switch receives packets of the synthetic flow back, the switch can promote the packets to a loop-detection process. The loop-detection process can then determine the presence of a loop. However, if the network operates using multiple paths, such as the fabric or its underlying physical network, the packets of the synthetic flow may correctly be forwarded to the switch. Consequently, the switch may erroneously detect a loop.

The switch may avoid such a scenario by examining a number of flows returning back to the switch. The switch can sample packets from real traffic flows and forward copies of the sampled packets to the loop-detection process. However, monitoring packets of a large number of flows may require a large number of corresponding rules in the hardware resources (e.g., ternary content-addressable memory (TCAM) entries) of the switch. Since such resources are limited in the switch, such significant overhead can strain the resources. In particular, since the capacity of a TCAM is limited, a large number of filtering rules in the TCAM can be inefficient.

To solve this problem, the switch can incorporate a loop indicator, which is uniquely associated with the switch, in a tunnel header of a packet of a data flow. The unique loop indicator, or unique indicator, can tag packets of the data flow. The packet can be received from an edge port of the switch. A respective edge port may couple an end device (or a host) to the switch. Hence, packets received from the edge port can be layer-2 packets, such as Ethernet frames. The switch can include the unique indicator in a field or an additional header associated with the tunnel header. The switch may perform this operation for a predetermined testing period if loop detection is needed. Incorporating the unique indicator in the header can be performed at the data plane without promoting the packet to the control plane for additional intervention. Since the destination address of the packet can be associated with a device external to the local fabric, the switch can forward the encapsulated packet to the VGS of the fabric.

The VGS can be configured with a forwarding rule in the forwarding hardware of the participating switches (e.g., in the TCAMs of the participating switches) that instructs the VGS to copy the unique indicator, if present, to an outgoing tunnel header. Accordingly, upon receiving the encapsulated packet, the VGS (i.e., the receiving participating switch) can obtain the unique indicator and decapsulate the tunnel header to obtain the packet. If the packet is destined to a device reachable via a remote fabric, the VGS can re-encapsulate the packet with an inter-fabric tunnel header. The VGS can incorporate the unique indicator in the inter-fabric tunnel header based on the rule and forward the encapsulated packet via the routed network to the remote fabric. Since the tunneling protocols can be different for intra-fabric and inter-fabric communication, the unique indicator can be placed in different fields or additional headers.

The remote VGS can receive the encapsulated packet and obtain the unique indicator. Due to an error in the configuration, the remote VGS may flood the local fabric (i.e., forward via a respective tunnel in the local fabric). The remote VGS may also forward the packet via an inter-fabric tunnel to another VGS. Based on the rule in the forwarding hardware, the remote VGS can incorporate the unique indicator in the inter-fabric tunnel header. In this way, the packet carrying the unique indicator in the respective tunnel headers may travel via multiple fabrics to return back to the originating fabric, thereby forming a loop. Upon receiving the packet back, the VGS of the originating fabric may then forward the packet back to the originating switch.

The originating switch's forwarding hardware can be configured with a packet inspection rule that instructs the switch to filter for the unique indicator in the tunnel header of the data flow. The rule can also instruct that, if the unique indicator is identified in the tunnel header, a copy of the packet should be promoted to a loop-detection process, such as a control plane tool. For example, the rule can be a "match-and-punt" filter configured in the TCAM of the switch. The filter can match a particular flow (e.g., the flow of the packet) and punt (e.g., move forward) the packet carrying the unique indicator to the loop-detection process. The filtering can facilitate the packet inspection operation for the switch.

In this way, a single rule in the forwarding hardware can facilitate the loop detection operation without straining the hardware resources of the switch. Promoting a single packet to the loop-detection process can be indicative of the loop. However, the loop-detection process may determine the presence of the loop upon receiving a threshold number of promoted packets. The switch may remove the rule from the forwarding hardware upon detecting a loop or expiration of the testing period. For example, the switch can remove the entry comprising the rule from the TCAM of the switch.

The switch may incorporate the unique indicator in packets of a respective flow originated from an end device, which can be received from the edge port, for the testing period. This can allow the loop-detection process to identify the individual flow that has caused the loop. Consequently, the switch can use the same unique indicator for multiple flows without requiring individual rules for each flow. As a result, to detect a loop, the forwarding hardware does not need flow-matching rules (e.g., matching source and destination identifiers and ports) for each flow. Upon detecting a loop, the loop-detection process may facilitate loop protection by deactivating a tunnel to prevent the loop within a fabric. The loop-detection process may also facilitate loop isolation by determining which devices are causing the loop.

If a plurality of switches of the complex network, which may belong to different fabrics, may run the loop-detection process simultaneously, using the same indicator may lead to false positives. Hence, each switch in the complex network may use an indicator that uniquely corresponds to that switch. In other words, the indicators in the entire complex network may not be repeated. As a result, the indicator used by a respective switch of a respective fabric should be unique. To avoid allocation of a unique indicator to each switch, a unique value associated with the switch can be used as the unique indicator. Examples of the unique value can include, but are not limited to, a media access control (MAC) address, an administrative or administrator IP address allocated to the switch, and a hardware tag (e.g., the chassis serial number).

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of loop detection in a complex network topology comprising multiple distributed tunnel fabrics, in accordance with an aspect of the present application. A network 100 can include a number of switches and devices. In some examples, network 100 can be based on one or more of: an Ethernet, InfiniBand, or other networks. Accordingly, network 100 may use a corresponding communication protocol, such as Internet Protocol (IP), FibreChannel over Ethernet (FCoE), or other protocols. Network 100 can have a complex network topology comprising a plurality of tunnel fabrics 110, 120, 130, and 140. These fabrics can be coupled to each other via a routed network 150 (e.g., a BGP network). Hence, network 100 can be referred to as a complex network.

A respective link in each of fabrics 110, 120, 130, and 140 can be a tunnel. Switches in a respective fabric may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 119, such as an EVPN, can be deployed over fabric 110. Similarly, a VPN can be deployed over each of fabrics 120, 130, and 140 as well. In FIG. 1, fabric 110 can be coupled to network 150 via VGS 111 of fabric 110. Switches 112 and 113 of fabric 110 can operate as a single switch in conjunction with each other to facilitate VGS 111. VGS 111 can be associated with one or more virtual addresses (e.g., a virtual IP address and/or a virtual MAC address). A respective tunnel formed at VGS 111 can use the virtual address to form the tunnel endpoint.

As a result, other tunnel endpoints, such as switches 114, 115, and 116, of fabric 110 can consider VGS 111 as the other tunnel endpoint for a tunnel instead of switches 112 and 113. To forward traffic toward VGS 111, a switch in fabric 110, such as switch 115, can perform a load balancing operation and select one of switches 112 and 113 as the destination (i.e., the other tunnel endpoint). Similarly, fabric 120 can include VGS 121, and switches 122 and 123; fabric 130 can include VGS 131, and switches 132, 133, and 134; and fabric 140 can include VGS 141, and switches 142 and 143. An end device 117, such as a client device or a host, can be coupled to switch 115. End devices 118, 124, and 135 can be coupled to switches 115, 122, and 133, respectively. End devices 144 and 145 can be coupled to switch 142. An end device can be a VM, a physical device, or a physical device running a VM (e.g., on an operating system).

In network 100, fabrics may be located in different geographic location. A respective VGS pair, such as VGS 111 and 121, can form a tunnel between them for communicating across network 150. Accordingly, a packet from device 118 to device 124 can be sequentially forwarded via corresponding tunnels in fabric 110, network 150, and fabric 120. For example, VGS 111 can terminate a tunnel in fabric 110 for the packet and re-encapsulate the packet with another tunnel to forward via network 150. Hence network 100 can be considered as a multi-hop overlay network. Because of the geographically distributed nature of network 100, a respective fabric of network 100 may be managed by different administrative entities. Furthermore, the end devices, such as end devices 117 and 124, can be mobile because of VM migration and wireless mobility. Consequently, the client or tenant workload in network 100 may move across fabrics and become unpredictable.

Due to the complexity of the topology of network 100, diverse management of the fabrics, and unpredictable workload attachment, identifying a loop in network 100 can be challenging. To detect a loop in network 100, a switch, such as switch 115, may inject synthetic traffic flow into network 100. The synthetic traffic can be multi-destination traffic (e.g., BUM traffic on a VLAN or IP traffic). If switch 115 receives packets of the synthetic flow back, switch 115 can promote the packets to a loop-detection process. The loop-detection process can then determine the presence of a loop. However, the underlying physical network of fabric 110 may operate using multiple paths. Hence, the packets of the synthetic flow may correctly be forwarded to switch 115. Consequently, switch 115 may erroneously detect a loop.

To avoid such a scenario, switch 115 may need to examine a large number of flows returning back to switch 115. Switch 115 can sample packets from real traffic flows and forward copies of the sampled packets to the loop-detection process. Since network 100 can include a number of fabrics, each deploying multi-path routing in their respective underlying networks, detecting such a loop may require sampling a large number of flows. However, monitoring packets of a large number of flows may require a large number of corresponding rules in the hardware resources (e.g., TCAM entries) of switch 115. Since such resources are limited in switch 115, such significant overhead can put a strain on the resources.

To solve this problem, switch 115 can incorporate a loop indicator 170, which is uniquely associated with switch 115, in a tunnel header of a packet of a data flow. Hence, loop indicator 170 can also be referred to as a unique loop indicator 170 or unique indicator 170. Unique indicator 170 can tag packets of the data flow and hence, can also be referred to as a flow tag. During operation, switch 115 can receive a packet 152 from end device 118 via an edge port of switch 115. Packet 152 can be destined to outside of fabric 110. Switch 115 can encapsulate packet 152 with a tunnel header to generate an encapsulated packet 154. The tunnel header allows packet 154 to be forwarded via the corresponding tunnel. The source address of the tunnel header can be an identifier, such as an IP address, of switch 115.

Since the destination address of packet 152 can correspond to a device not coupled to fabric 110, the destination address of the tunnel header can be an identifier of VGS 111. Examples of a tunnel header can include, but are not limited to, a VXLAN header, a Generic Protocol Extension for VXLAN (VXLAN-GPE) header, a VXLAN-Geneve header, a VXLAN Group Policy Option (VXLAN-GPO) header, an IPSec header, and a GRE header. If the tunnel header includes a VXLAN or VXLAN-GPO header, switch 115 can include unique indicator 170 in a field of the tunnel header. On the other hand, if the tunnel header includes a VXLAN-GPE or VXLAN-Geneve header, switch 115 can include unique indicator 170 in an additional header associated with the tunnel header.

Switch 115 may continue to include unique indicator 170 to packets belonging to the flow of packet 152 for a predetermined testing period if loop detection is needed at switch 115. An administrator may configure the testing period and trigger the loop detection operation at switch 115. Since switch 115 can incorporate unique indicator 170 into a packet of the data plane (i.e., real-life data flow received from device 118), switch 118 can perform the loop detection operation without promoting packet 154 to the control plane for additional intervention. Switch 115 can then forward encapsulated packet 154 to VGS 111.

Switches 112 and 113 of VGS 111 can be configured with a forwarding rule in the forwarding hardware (e.g., in the corresponding entries of TCAMs of switches 112 and 113). The forwarding rule may instruct VGS 111 (i.e., switches 112 and 113) to copy unique indicator 170, if present, from an ingress tunnel header to an egress tunnel header. Accordingly, upon receiving encapsulated packet 154, VGS 111 can obtain unique indicator 110 from the tunnel header at the receiving participating switch. VGS 111 can then decapsulate the tunnel header to obtain packet 152. If packet 152 is destined to a device reachable via fabric 140, VGS 111 can re-encapsulate packet 152 with an inter-fabric tunnel header to generate inter-fabric packet 156. VGS 111 can incorporate unique indicator 170 in the inter-fabric tunnel header based on the rule and forward packet 156 via network 150 to fabric 140.

Since the tunneling protocols can be different for intra-fabric and inter-fabric communication, unique indicator 170 can be placed in different fields or additional headers in packets 154 and 156. VGS 141 can receive packet 156 and obtain unique indicator 170 from the tunnel header. VGS 141 can then decapsulate the tunnel header to obtain packet 152. Due to an error in the configuration, VGS 141 may flood fabric 140 by encapsulating packet 152 and forwarding via corresponding tunnels in fabric 140. VGS 141 may also encapsulate packet 152 with an inter-fabric tunnel header to generate inter-fabric packet 158. Based on the rule in the forwarding hardware of the participating switches of VGS 141 of fabric 140, VGS 141 can incorporate unique indicator 170 in the inter-fabric tunnel header. VGS 141 can then forward packet 158 to VGS 131 via the corresponding inter-fabric tunnel to fabric 130.

VGS 131 may obtain unique indicator 170 from the tunnel header of packet 158 and decapsulate the tunnel header to obtain packet 152. If the VGS 131 is also erroneously configured, VGS 131 can encapsulate packet 152 with an inter-fabric tunnel header to generate inter-fabric packet 160. Based on the rule in the forwarding hardware of the participating switches of VGS 131 of fabric 130, VGS 131 can incorporate unique indicator 170 in the inter-fabric tunnel header. VGS 111 can then forward packet 160 to back VGS 111 via the corresponding inter-fabric tunnel to fabric 110, thereby forming a loop. VGS 111 may then obtain packet 152 from packet 160 and encapsulate packet 152 with an encapsulation header to generate encapsulated packet 162. VGS 111 can then incorporate unique indicator 170 into the encapsulation header and forward packet 162 back to originating switch 115.

Switch 115's forwarding hardware can be configured with a rule that instructs switch 115 to filter for unique indicator 170 in the tunnel header of the data flow of packet 152. The rule can be a packet inspection rule in an entry of the TCAM of switch 115. The rule can also instruct that, if unique indicator 170 is identified in the tunnel header, a copy of packet 162 should be promoted to a loop-detection process 180, such as a control plane loop-detection tool. Based on unique indicator 170 in the tunnel header of packet 162, loop-detection process 180 can determine the presence of a loop and notify an administrator regarding the loop.

In this way, a single rule in the forwarding hardware of switch 115 can facilitate the loop detection operation without straining the hardware resources of switch 115. Promoting a single packet, such as packet 162, to loop-detection process 180 can be sufficient to indicate a loop in network 100. However, loop-detection process 180 may determine the presence of the loop upon receiving a threshold number of promoted packets from the forwarding hardware of switch 115. Switch 115 may remove the rule from the forwarding hardware upon detecting a loop or expiration of the testing period.

Switch 115 may incorporate unique indicator 170 for a respective flow originated from end device 118 for the testing period. This can allow loop-detection process 180 to identify an individual flow that has caused the loop. Consequently, switch 115 can use the same unique indicator 170 for multiple flows without requiring individual rules for each flow. As a result, to detect a loop, the forwarding hardware of switch 115 does not need flow-matching rules (e.g., matching source and destination identifiers and ports) for each flow. Upon detecting a loop, loop-detection process 180 may facilitate loop protection by deactivating a tunnel to prevent the loop within fabric 110. Loop-detection process 180 may also facilitate loop isolation by determining which devices are causing the loop.

If a plurality of switches, such as switch 115 and 143 of network 100, which belong to different fabrics 110 and 140, respectively, run an instance of loop-detection process 180 simultaneously, using the same indicator may lead to false positives. Hence, each switch in network 100 may use a loop indicator that uniquely corresponds to that switch. In other words, loop indicator 170 may not be repeated in network 100 even for a switch in another fabric, such as fabric 120, 130, or 140. As a result, loop indicator 170 associated with switch 115 should be distinguishable from a loop indicator 172 associated with switch 143. To avoid manual allocation of unique indicators 170 and 172 to switches 115 and 143, respectively, a unique value associated with a switch can be used as the unique indicator. The unique value can be a MAC address, an administrative or administrator IP address allocated to the switch, or a hardware tag. For example, unique indicators 170 and 172 can be the administrator IP addresses allocated to switches 115 and 143, respectively.

Figure 2:
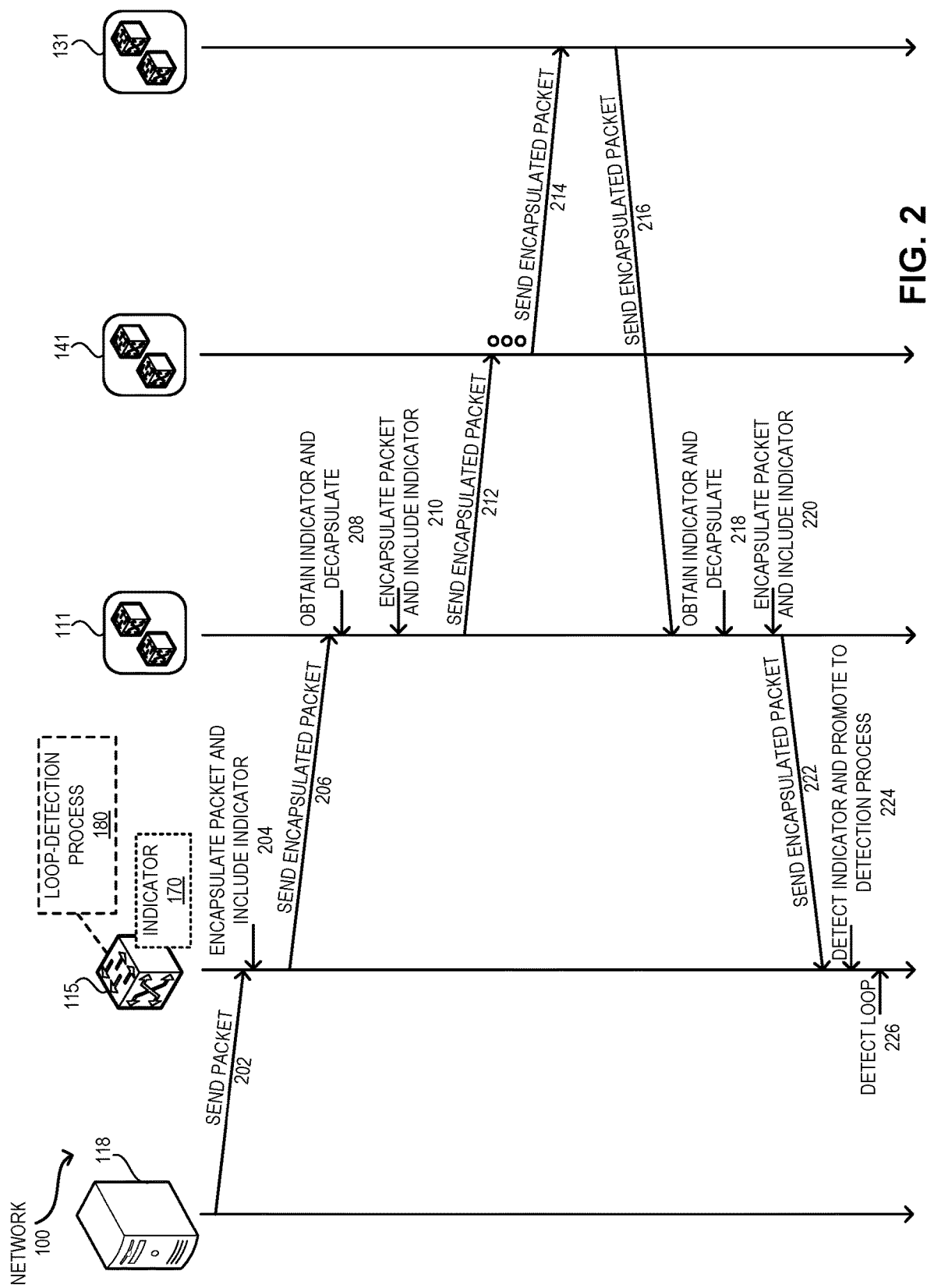
FIG. 2 illustrates an example of distributed communication for detecting a loop in a complex network topology comprising multiple distributed tunnel fabrics, in accordance with an aspect of the present application.

FIG. 2 illustrates an example of distributed communication for detecting a loop in a complex network topology comprising multiple distributed tunnel fabrics, in accordance with an aspect of the present application. During operation, end device 118 can send a packet to switch 115 via an edge port (operation 202). The packet can be destined to a device reachable via a remote fabric. Upon receiving the packet, switch 115 can encapsulate the packet and include unique indicator 170 in the tunnel header of the packet (operation 204). Switch 115 can then send the encapsulated packet to VGS 111 (operation 206). VGS 111 can obtain unique indicator 170 and decapsulate the tunnel header (operation 208). Based on the destination of the packet, VGS 111 can determine that the packet should be sent to a remote fabric.

VGS 111 can then encapsulate the packet with an inter-fabric header and include unique indicator 170 in the inter-fabric header based on a rule configured in the forwarding hardware of a respective participating switch of VGS 111 (operation 210). Subsequently, VGS 111 can send the encapsulated inter-fabric packet to VGS 141, which is the gateway for remote fabric 140, as described in conjunction with FIG. 1 (operation 212). If VGS 141 is configured with errors, VGS 141 may forward an encapsulated inter-fabric packet carrying unique indicator 170 to VGS 131 (operation 214). Similarly, if VGS 131 is configured with errors, VGS 131 may forward an encapsulated inter-fabric packet carrying unique indicator 170 back to VGS 111 (operation 216), thereby creating a loop in network 100.

VGS 111 can obtain unique indicator 170 and decapsulate the inter-fabric header (operation 218). VGS 111 can then encapsulate the packet with a tunnel header and include unique indicator 170 in the tunnel header (operation 220). Subsequently, VGS 111 can send the encapsulated packet back to originating switch 115 (operation 222). Switch 115 can detect unique indicator 170 and promote the packet to loop-detection process 180 (operation 224). Loop-detection process 180 can determine that a packet carrying unique indicator 170 has returned to switch 115 and detect the presence of a loop in network 100 (operation 226).

The forwarding hardware of switch 115 can include a rule for determining the presence of the unique indicator in an incoming encapsulated packet and promoting the encapsulated packet to loop-detection process 180. For example, the rule can be a "match-and-punt" filter configured in the TCAM. The filter can match a particular flow (e.g., the flow of the packet received at switch 115) and punt (e.g., move forward) the packet carrying the unique indicator to loop-detection process 180. It should be noted that the filter may also match a plurality of flows received at switch 115 (e.g., all flows received at an edge port). Hence, a single filter can be sufficient for facilitating the promotion to loop-detection process 180 without straining hardware resources of switch 115.

Figure 3A:
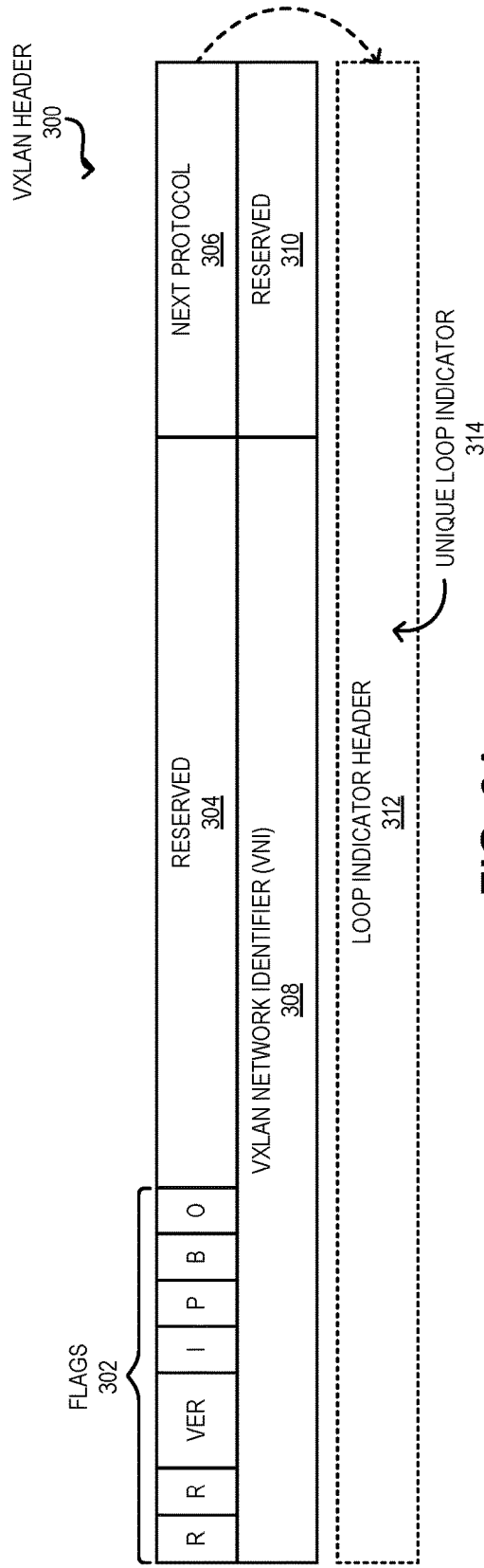
FIG. 3A illustrates an example of incorporating a loop indicator in a tunnel header using a next-protocol additional header, in accordance with an aspect of the present application.

FIG. 3A illustrates an example of incorporating a loop indicator in a tunnel header using a next-protocol additional header, in accordance with an aspect of the present application. A VXLAN header 300, which can be a VXLAN-GPE header, can include a set of flags 302, a reserved field 304, a next protocol field 306, a VNI field 308, and a reserved field 310. VXLAN-GPE header 300 can allow a user-defined header to be carried as an additional header. Next protocol field 306 identifies the next header carried by VXLAN-GPE header 300. The VXLAN GPE standard (e.g., the Internet Engineering Task Force (IETF) draft for VXLAN GPE) indicates a range of values for next protocol field 306. For example, a hexadecimal value of 1, 2, or 3 in next protocol field 306 can indicate an additional IP version 4, IP version 6, or Ethernet header, respectively.

Furthermore, the range of values also includes a set of unassigned ranges. A value of the unassigned range can be used to indicate the presence of an additional loop indicator header 312. The value can be predefined (e.g., defined and configured by an administrator) and persistent across the entire complex network, such as network 100 of FIG. 1. A unique loop indicator 314 can be carried by loop indicator header 312. Loop indicator header 312 can align with VXLAN-GPE format requirements. Hence, if the egress tunnel for a switch is based on VXLAN-GPE, the switch can include unique indicator 314 in loop indicator header 312 and include the predefined value in next protocol field 306 of VXLAN-GPE header 300.

Figure 3B:
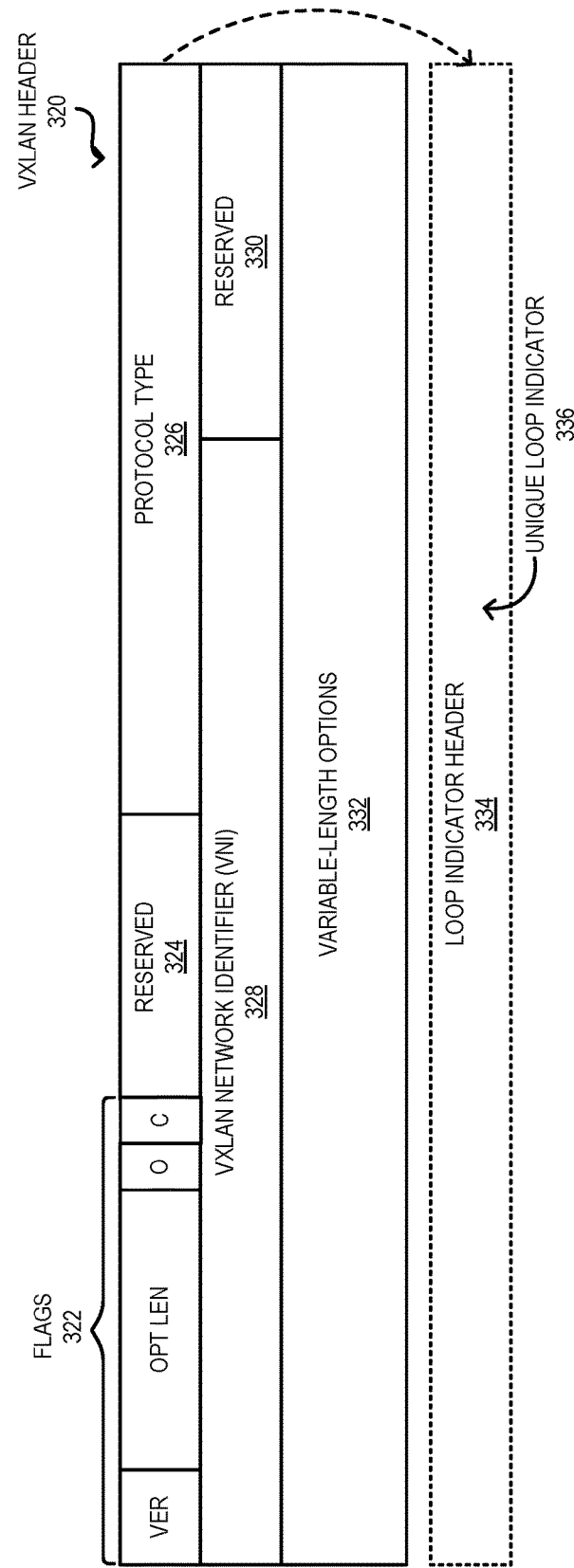
FIG. 3B illustrates an example of incorporating a loop indicator in a tunnel header using a protocol-type additional header, in accordance with an aspect of the present application.

FIG. 3B illustrates an example of incorporating a loop indicator in a tunnel header using a protocol-type additional header, in accordance with an aspect of the present application. A VXLAN header 320, which can be a VXLAN-Geneve header, can include a set of flags 322, a reserved field 324, a protocol type field 326, a VNI field 328, and a reserved field 320. VXLAN-Geneve header 320 can further support variable-length operations 332. VXLAN-Geneve header 320 can also allow a user-defined header to be carried as an additional header. Protocol type field 326 can identify the next header carried by VXLAN-Geneve header 320. The VXLAN-Geneve standard (e.g., the IETF Request for Comment (RFC) for VXLAN-Geneve) indicates the protocol types and their corresponding values.

One such value can be included in protocol type field 326. One of the unused values for protocol type field 326 can be used to indicate the presence of an additional loop indicator header 334. The value can be persistent across the entire complex network. A unique loop indicator 336 can be carried by loop indicator header 334. Loop indicator header 334 can align with VXLAN-Geneve format requirements. Hence, if the egress tunnel for a switch is based on VXLAN-Geneve, the switch can include unique indicator 336 in loop indicator header 334 and include the predefined value in protocol type field 326 of VXLAN-Geneve header 320.

FIG. 3C illustrates an example of incorporating a loop indicator in a tunnel header using a set of reserved flag bits, in accordance with an aspect of the present application. A VXLAN header 340, which can be a VXLAN-GPO header, can include a set of flags 342, a group policy identifier field 344, a VNI field 346, and a reserved field 348. Since VXLAN-GPO header 340 may not support an additional header, one of the fields of VXLAN-GPO header 340 may carry a unique loop indicator 350. For example, VXLAN-GPO header 340 can carry unique indicator 350 in a set of reserved bits in flags 342 (denoted with bold lines).

However, due to the limited number of bits available for carrying such an indicator, the number of unique loop indicators can be limited in the complex network. In this example, four reserved bits can support sixteen unique indicators. Hence, the loop detection operation may simultaneously execute on sixteen different switches of the complex network. Unique indicator 350 can share bit-space with group policy identifier field 344 and VNI field 346. Hence, a respective switch of the complex network can be aware of the sharing and the number of bits allocated to unique indicator 350. In this way, the standard VXLAN-GPO policies and the loop detection features do not overstep each other.

FIG. 3D illustrates an example of incorporating a loop indicator in a tunnel header using a reserved field, in accordance with an aspect of the present application. A VXLAN header 360, which can be a standard VXLAN header, can include a set of flags 362, a reserved field 364, a VNI field 366, and a reserved field 368. Since VXLAN header 360 may not support an additional header, one of the fields of VXLAN header 360 may carry a unique loop indicator 350. For example, VXLAN-GPO header 340 can carry unique indicator 370 in at least a portion of reserved field 364. Since reserved field 364 may have a large number of bits, unique indicator 370 can support a large number of unique indicators.

Figure 4A:
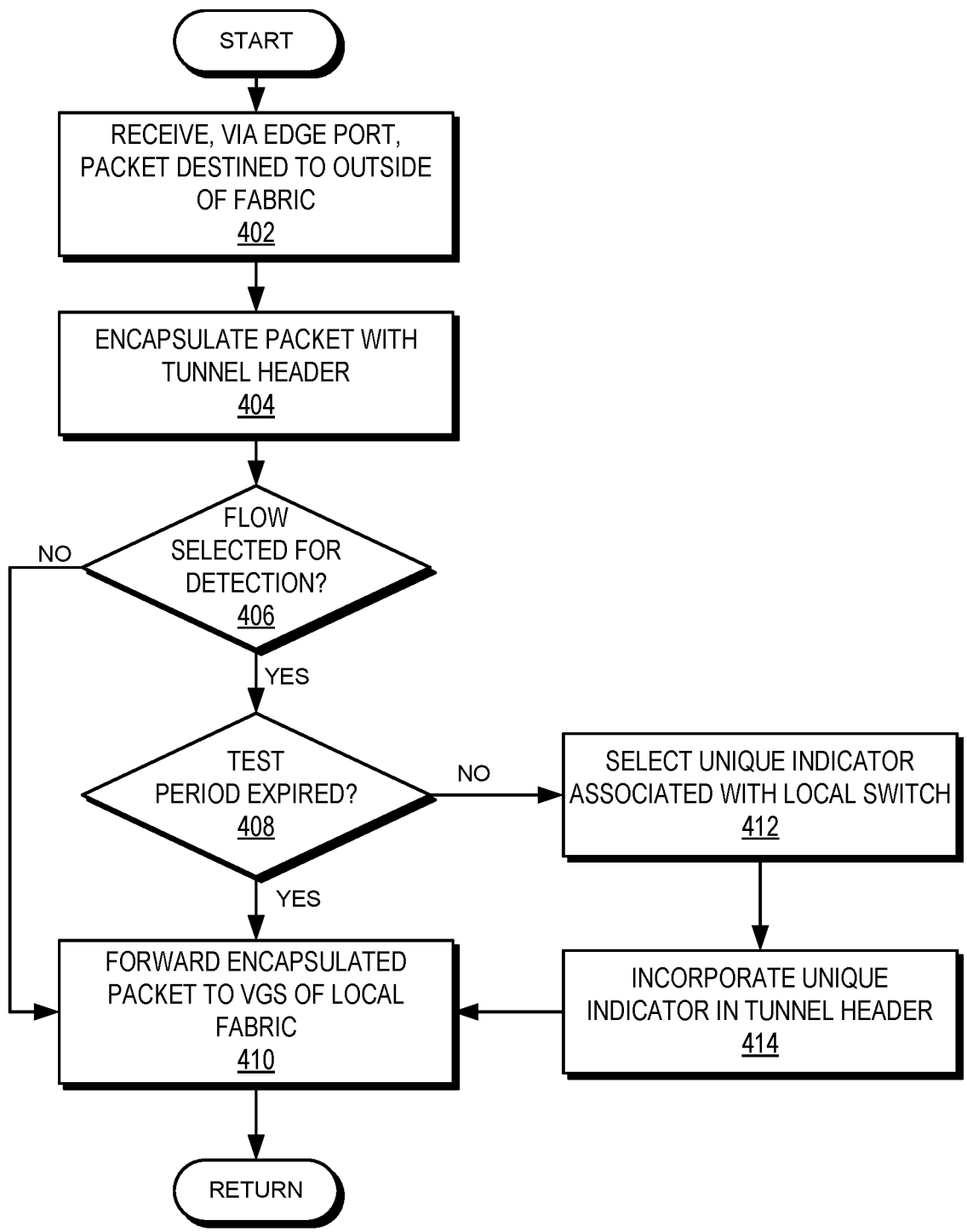
FIG. 4A presents a flowchart illustrating the process of a switch incorporating a loop indicator in a tunnel header, in accordance with an aspect of the present application.

FIG. 4A presents a flowchart illustrating the process of a switch incorporating a loop indicator in a tunnel header, in accordance with an aspect of the present application. During operation, the switch can receive, via an edge port, a packet destined to the outside of the fabric (operation 402) and encapsulate the packet with a tunnel header (operation 404). The switch can then determine whether the flow of the packet is selected for the detection process (operation 406). If the flow is selected, the switch can also determine whether the test period has expired (operation 408).

If the flow is selected (operation 406) and the test period has not expired (operation 408), the switch can select the unique indicator associated with the local switch (operation 412) and incorporate the unique indicator in the tunnel header (operation 414). If the flow is not selected (operation 406), the test period has expired (operation 408), or the switch has incorporated the unique indicator in the tunnel header (operation 414), the switch can forward the encapsulated packet to the VGS of the local fabric (operation 410).

Figure 4B:
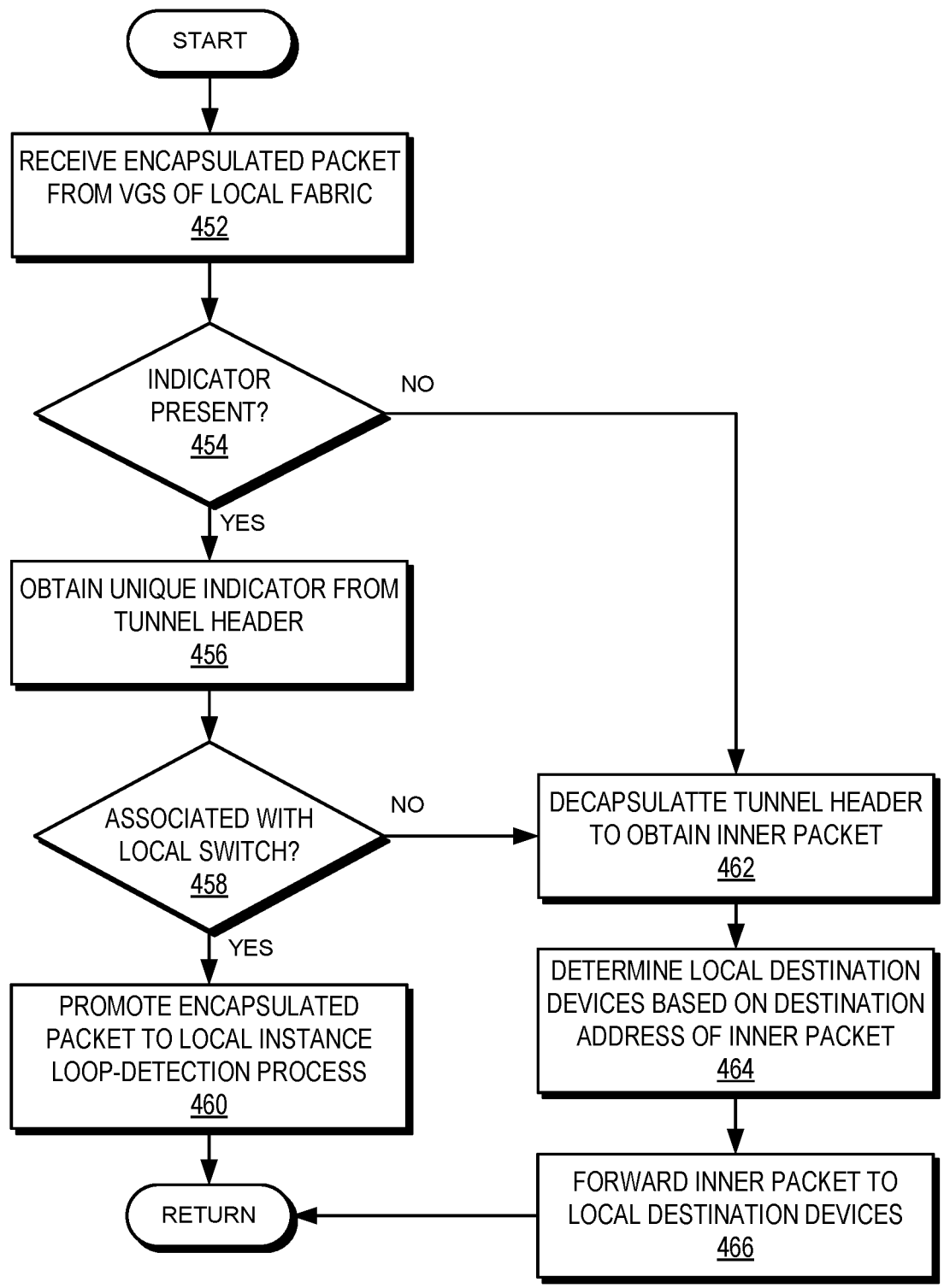
FIG. 4B presents a flowchart illustrating the process of a switch detecting a loop based on a loop indicator in a tunnel header, in accordance with an aspect of the present application.

FIG. 4B presents a flowchart illustrating the process of a switch detecting a loop based on a loop indicator in a tunnel header, in accordance with an aspect of the present application. During operation, the switch can receive an encapsulated packet from the VGS of the local fabric (operation 452) and determine whether the indicator is present in the encapsulated packet (operation 454). If the indicator is present in the encapsulated packet, the switch can obtain the unique indicator from the tunnel header (operation 456) and determine whether the unique indicator is associated with the local switch (operation 458). If the unique indicator is associated with the local switch, the switch can promote the encapsulated packet to the local instance of the loop-detection process (operation 460).

On the other hand, if the indicator is not present in the encapsulated packet (operation 454) or the unique indicator is not associated with the local switch (operation 458), the switch can decapsulate the tunnel header to obtain the inner packet (operation 462). The switch can then determine the local destination devices based on the destination address of the inner packet (operation 464). For example, if the destination address is a multicast address, the local destination devices can be the recipients (or clients) of the multicast group associated with the multicast address. The switch can then forward the inner packet to the local destination devices (operation 466).

Figure 5A:
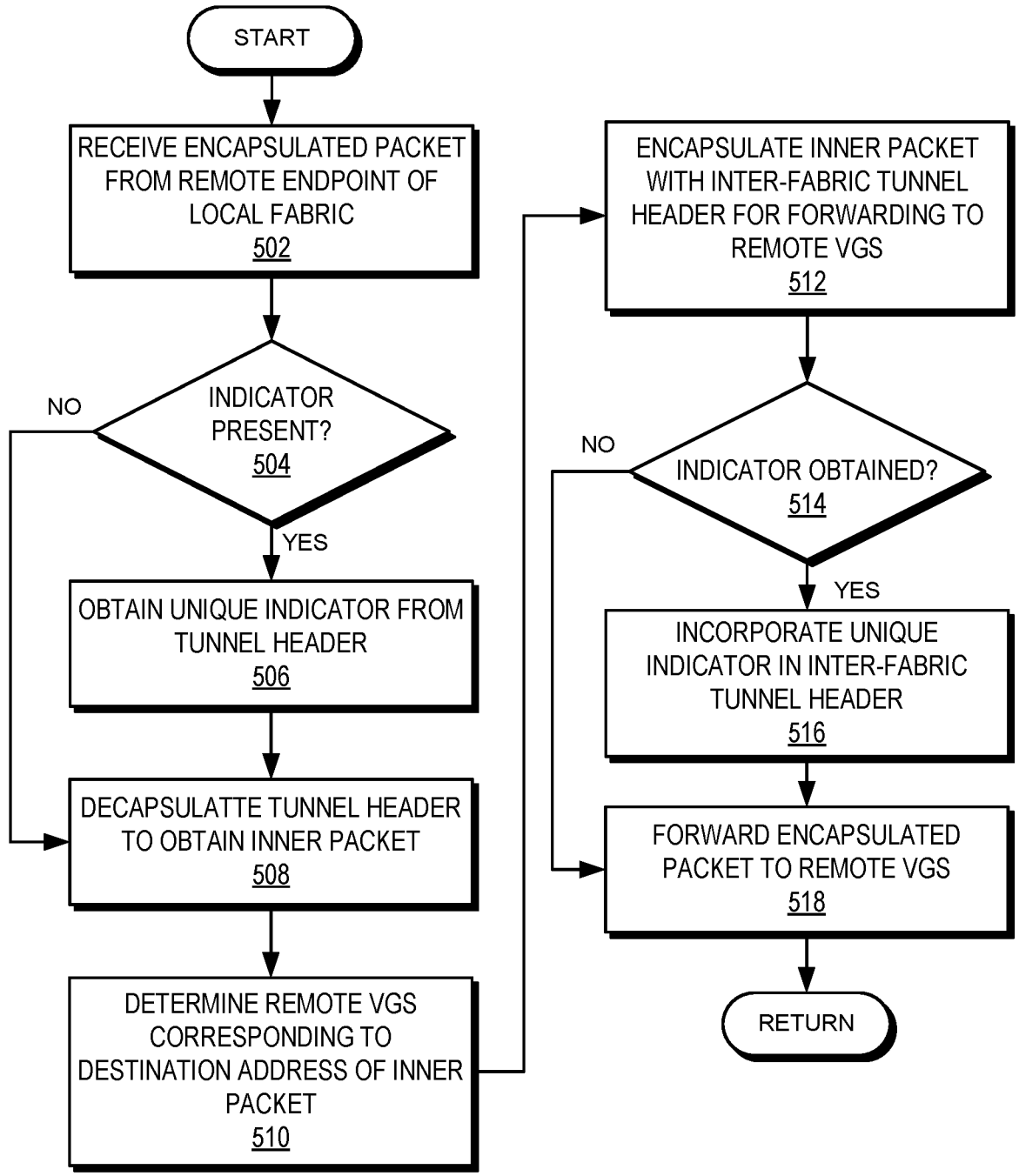
FIG. 5A presents a flowchart illustrating the process of a participating switch of a virtual gateway switch (VGS) incorporating a loop indicator associated with the local fabric in a tunnel header, in accordance with an aspect of the present application.

FIG. 5A presents a flowchart illustrating the process of a participating switch of a VGS incorporating a loop indicator associated with the local fabric in a tunnel header, in accordance with an aspect of the present application. During operation, the switch can receive an encapsulated packet from a remote endpoint of the local fabric (operation 502) and determine whether the unique indicator is present in the packet (operation 504). If the indicator is present in the encapsulated packet, the switch can obtain the unique indicator from the tunnel header (operation 506). If the indicator is not present in the encapsulated packet (operation 504) or upon obtaining the unique indicator (operation 506), the switch can decapsulate the tunnel header to obtain the inner packet (operation 508).

The switch can then determine a remote VGS corresponding to the destination address of the inner packet (operation 510) and encapsulate the inner packet with an inter-fabric tunnel header for forwarding to the remote VGS (operation 512). The switch can determine whether the local switch has obtained the indicator (operation 514). If the indicator is obtained, the switch can incorporate the unique indicator in the inter-fabric tunnel header (operation 516). If the indicator is not obtained (operation 514) or upon incorporating the unique indicator (operation 516), the switch can forward the encapsulated packet to the remote VGS (operation 518).

Figure 5B:
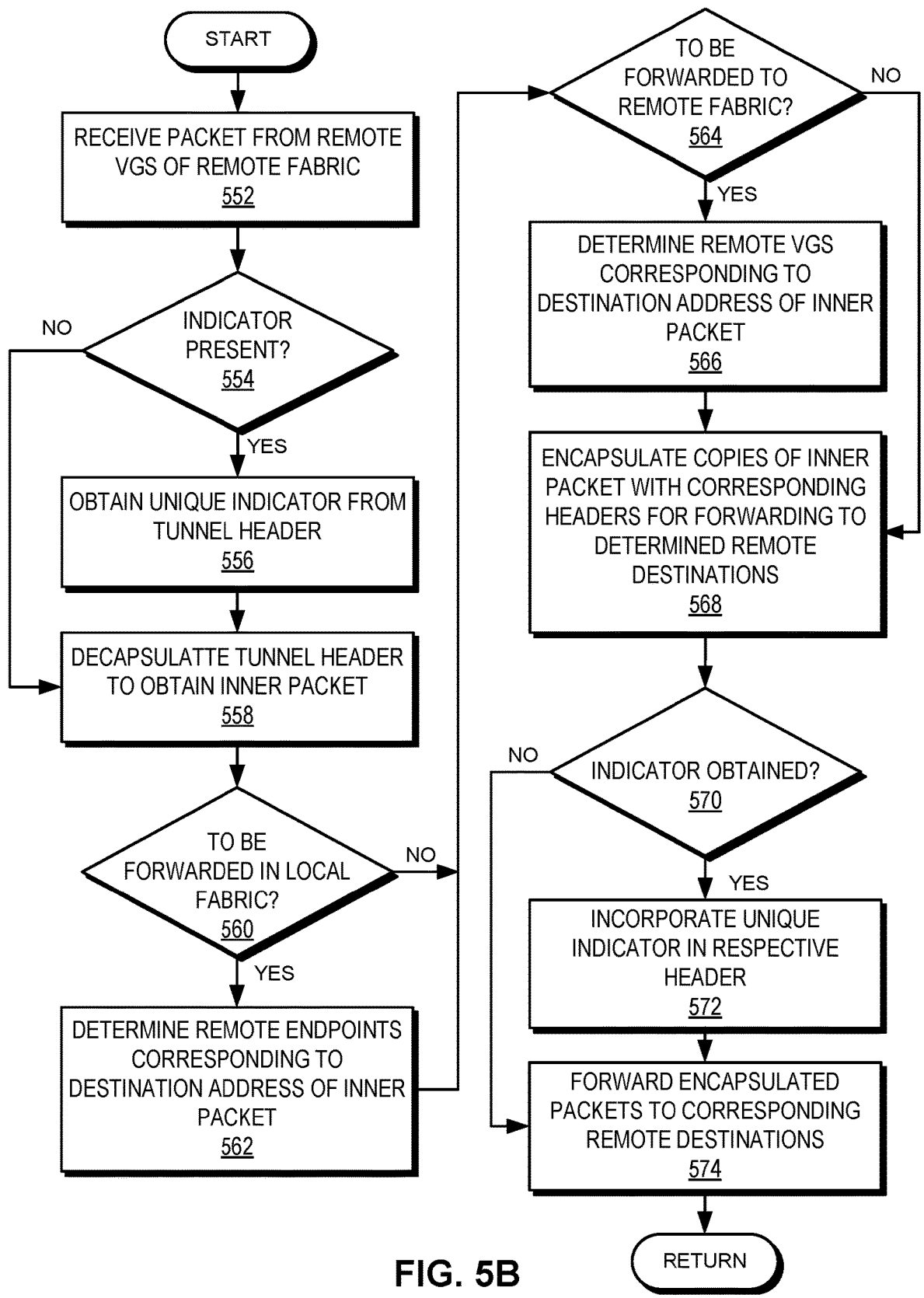
FIG. 5B presents a flowchart illustrating the process of a participating switch of a VGS incorporating a loop indicator associated with a remote fabric in a tunnel header, in accordance with an aspect of the present application.

FIG. 5B presents a flowchart illustrating the process of a participating switch of a VGS incorporating a loop indicator associated with a remote fabric in a tunnel header, in accordance with an aspect of the present application. During operation, the switch can receive a packet from the remote VGS of a remote fabric (operation 552) and determine whether the unique indicator is present in the packet (operation 554). If the indicator is present in the encapsulated packet, the switch can obtain the unique indicator from the tunnel header (operation 556). If the indicator is not present in the encapsulated packet (operation 554) or upon obtaining the unique indicator (operation 556), the switch can decapsulate the tunnel header to obtain the inner packet (operation 558).

The switch can then determine whether the inner packet is to be forwarded in the local fabric (operation 560). If the inner packet is to be forwarded in the local fabric, the switch can determine the remote endpoints corresponding to the destination address of the inner packet (operation 562). If the inner packet is not to be forwarded in the local fabric (operation 560) or upon determining the remote endpoints (operation 562), the switch can also determine whether the inner packet is to be forwarded to a remote fabric (operation 564). If the inner packet is to be forwarded in a remote fabric, the switch can determine the remote VGS corresponding to the destination address of the inner packet (operation 566).

If the inner packet is not to be forwarded in a remote fabric (operation 564) or upon determining the remote VGS (operation 566), the switch can encapsulate copies of the inner packet with corresponding headers for forwarding to the determined remote destinations (operation 568). For example, for the remote endpoints, the headers can be tunnel headers. On the other hand, for the remote VGS, the header can be an inter-fabric header. The switch can determine whether the local switch has obtained the indicator (operation 570). If the indicator is obtained, the switch can incorporate the unique indicator in a respective header (operation 572). If the indicator is not obtained (operation 570) or upon incorporating the unique indicator (operation 572), the switch can forward the encapsulated packets to corresponding remote destinations (operation 574).

Figure 6:
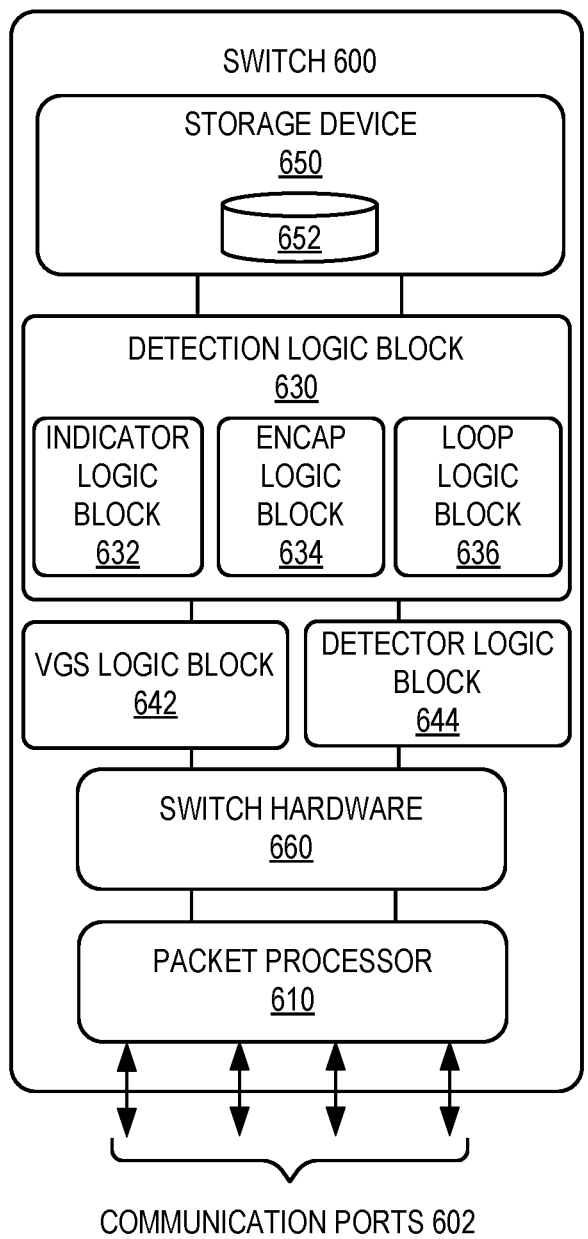
FIG. 6 illustrates an exemplary switch facilitating loop detection in a complex network topology comprising multiple distributed tunnel fabrics, in accordance with an aspect of the present application.

FIG. 6 illustrates an exemplary switch facilitating loop detection in a complex network topology comprising multiple distributed tunnel fabrics, in accordance with an aspect of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with a respective multicast group, tunnel, EVPN, unique indicator information, and interfaces associated with switch 600. Switch 600 can include a VGS logic block 642. VGS logic block 642 can allow switch 600 to operate as a VGS, such as VGS 111, in a tunnel fabric. To do so, VGS logic block 642 may operate in conjunction with another switch. Switch 600 may also include a detector logic block 644 that can facilitate an instance of a loop-detection process (e.g., a control-plane tool) for switch 600. Hence, detector logic block 644 may operate in a control plane of switch 600.

Switch 600 can include a detection logic block 630, which can include an indicator logic block 632, an encapsulation logic block 634, and a loop logic block 636. Detection logic block 630 can determine a testing period for loop detection in a complex network. Indicator logic block 632 can determine a unique indicator associated with switch 600. Indicator logic block 632 can also incorporate the unique indicator in an encapsulation header (e.g., a tunnel header or inter-fabric header) of a packet. Encapsulation logic block 634 can obtain a unique indicator from an ingress encapsulation header and incorporate the unique indicator in an egress encapsulation header. Loop logic block 636 can promote a copy of an encapsulated packet to the loop-detection process upon identifying a unique indicator associated with switch 600 in the encapsulated packet.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. An apparatus, comprising:
a processor;
control circuitry comprising an indicator logic block and a loop logic block;
wherein the indicator logic block is to:
insert, at the apparatus, a predetermined value into an egress tunnel header of a first packet of a data flow, wherein a destination address of the egress tunnel header corresponds to a remote apparatus of a first overlay tunnel fabric that includes the apparatus, wherein the predetermined value is unique for the apparatus in a loop detection domain comprising at least the first overlay tunnel fabric and a second overlay tunnel fabric, and wherein tunnel encapsulation for a respective overlay tunnel fabric is initiated and terminated within the overlay tunnel fabric;
receive, via the remote apparatus, a second packet of the data flow from the second overlay tunnel fabric, wherein the second packet is encapsulated in an ingress tunnel header with a destination address corresponding to the apparatus; and
determine, for the second packet, whether the predetermined value is present in the ingress tunnel header; and
wherein the loop logic block is to, in response to identifying the predetermined value in the ingress tunnel header, determine that a loop is present in the loop detection domain.

2. The apparatus of claim 1, wherein the indicator logic block determines whether the predetermined value is present in the ingress tunnel header by applying a packet inspection rule for the data flow to the second packet at forwarding hardware of the apparatus.

3. The apparatus of claim 2, wherein the forwarding hardware of the apparatus includes a ternary content-addressable memory (TCAM); and
wherein an entry of the TCAM comprises the packet inspection rule.

4. The apparatus of claim 1, wherein the remote apparatus is a gateway of the first overlay tunnel fabric maintaining an inter-fabric tunnel with a second gateway of the second overlay tunnel fabric; and
wherein the inter-fabric tunnel spans a routed network.

5. The apparatus of claim 1, wherein the loop logic block determines the presence of the loop in the loop detection domain by promoting the second packet to a control plane of the apparatus.

6. The apparatus of claim 1, wherein the control circuitry further comprises a detection logic block to apply the packet inspection rule to a plurality of data flows; and
wherein the loop logic block is further to determine the presence of the loop in the loop detection domain in response to identifying the predetermined value in a received packet of at least one of the plurality of data flows.

7. The apparatus of claim 1, wherein the indicator logic block is further to insert the predetermined value in a predetermined location in the egress tunnel header of the first packet, wherein the predetermined location is determined based on a tunneling protocol associated with the egress tunnel header.

8. The apparatus of claim 7, wherein the predetermined location corresponds to one or more of:
a field of the egress tunnel header; and
an additional header supported by the egress tunnel header.

9. A method comprising:
inserting, by a switch, a predetermined value into an egress tunnel header of a first packet of a data flow, wherein a destination address of the egress tunnel header corresponds to a remote switch of a first overlay tunnel fabric that includes the switch, wherein the predetermined value is unique for the switch in a loop detection domain comprising at least the first overlay tunnel fabric and a second overlay tunnel fabric, and wherein tunnel encapsulation for a respective overlay tunnel fabric is initiated and terminated within the overlay tunnel fabric;

receiving, via the remote switch, a second packet of the data flow from the second overlay tunnel fabric, wherein the second packet is encapsulated in an ingress tunnel header with a destination address corresponding to the switch;

determining, for the second packet, whether the predetermined value is present in the ingress tunnel header; and in response to identifying the predetermined value in the ingress tunnel header, determining that a loop is present in the loop detection domain.

10. The method of claim 9, wherein determining whether the predetermined value is present in the ingress tunnel header comprises applying a packet inspection rule for the data flow to the second packet by forwarding hardware of the switch.

11. The method of claim 10, wherein the forwarding hardware of the switch includes a ternary content-addressable memory (TCAM); and wherein an entry of the TCAM comprises the packet inspection rule.

12. The method of claim 10, wherein the remote switch is a gateway switch of the first overlay tunnel fabric maintaining an inter-fabric tunnel with a second gateway switch of the second overlay tunnel fabric; and wherein the inter-fabric tunnel spans a routed network.

13. The method of claim 10, wherein determining the presence of the loop in the loop detection domain further comprises promoting the second packet to a control plane of the switch.

14. The method of claim 10, further comprising:

applying the packet inspection rule to a plurality of data flows; and determining the presence of the loop in the loop detection domain in response to identifying the predetermined value in a received packet of at least one of the plurality of data flows.

15. The method of claim 10, further comprising inserting the predetermined value in a predetermined location in the egress tunnel header of the first packet, wherein the predetermined location is determined based on a tunneling protocol associated with the egress tunnel header.

16. The method of claim 15, wherein the predetermined location corresponds to one or more of:

a field of the egress tunnel header; and an additional header supported by the egress tunnel header.

17. An apparatus, comprising:

a processor;

control circuitry comprising an encapsulation logic block and an indicator logic block;

wherein the encapsulation logic block is to determine, at the apparatus, whether a predetermined value is present in an ingress tunnel header encapsulating a packet of a data flow, wherein a source address of the ingress tunnel header corresponds to a remote apparatus of a first overlay tunnel fabric that includes the apparatus, wherein the predetermined value is unique for the remote apparatus in a loop detection domain comprising at least the first overlay tunnel fabric and a second overlay tunnel fabric, and wherein tunnel encapsulation for a respective overlay tunnel fabric is initiated and terminated within the overlay tunnel fabric; and in response to determining the presence of the predetermined value;

obtain the predetermined value; and decapsulate the ingress tunnel header to obtain the packet; and an indicator logic block to insert the predetermined value in an egress tunnel header encapsulating the packet, wherein a destination address of the egress tunnel header corresponds to a switch in the second overlay tunnel fabric.

18. The apparatus of claim 17, wherein the encapsulation logic block determines whether the predetermined value is present in the ingress tunnel header by applying a forwarding rule to the encapsulated packet by forwarding hardware of the apparatus, wherein the forwarding rule indicates that the predetermined value is to be carried to the egress tunnel header from the ingress tunnel header.

19. The apparatus of claim 18, wherein the forwarding hardware of the apparatus includes a ternary content-addressable memory (TCAM); and wherein an entry of the TCAM comprises the forwarding rule.

20. The apparatus of claim 17, wherein the indicator logic block is further to insert the predetermined value in a predetermined location in the egress tunnel header, wherein the predetermined location is determined based on a tunneling protocol associated with the egress tunnel header.

* * * * *